(12) United States Patent
Lin (10) Patent No.: US 8,579,707 B2
(45) Date of Patent: Nov. 12, 2013

(54) ANGLING JOYSTICK AND GAMING DEVICE HAVING SAME

(75) Inventor: Tsung-Yu Lin, Taipei Hsien (TW)

(73) Assignee: Hon Hai Precision Industry Co, Ltd, New Taipei (TW)

( * ) Notice: Subject to any disclaimer, the term of this patent is extended or adjusted under 35 U.S.C. 154(b) by 165 days.

(21) Appl. No.: 12/832,071

(22) Filed: Jul. 8, 2010

(65) Prior Publication Data

US 2011/0281651 A1 Nov. 17, 2011

(30) Foreign Application Priority Data

May 17, 2010 (TW) ................................ 99115634 A (51) Int. Cl.
*A63F 13/00* (2006.01)

(52) U.S. Cl.
USPC ............................................. 463/37; 463/46

(58) Field of Classification Search
USPC .................................. 463/7, 36, 37, 39, 43, 46
See application file for complete search history.

(56) References Cited

U.S. PATENT DOCUMENTS

| | | | | |
|---|---|---|---|---|
| 5,713,792 A | * | 2/1998 | Ohzono et al. | 463/7 |
| 6,537,154 B1 | * | 3/2003 | Ohgoshi et al. | 463/37 |
| 6,719,633 B1 | * | 4/2004 | Leifer et al. | 463/39 |
| 2005/0017454 A1 | * | 1/2005 | Endo et al. | 273/317.1 |
| 2007/0060383 A1 | * | 3/2007 | Dohta | 463/43 |
| 2010/0285883 A1 | * | 11/2010 | Zalewski | 463/39 |
| 2011/0244962 A1 | * | 10/2011 | Kidakarn | 463/36 |

* cited by examiner

*Primary Examiner* — Peter DungBa Vo
*Assistant Examiner* — Jeffrey Wong
(74) *Attorney, Agent, or Firm* — Altis Law Group, Inc.

(57) ABSTRACT

An exemplary embodiment of an angling joystick includes a body, an orientation indicating unit, an imitation fishing reel and a transceiver unit. The orientation indicating unit is attached to the body and is configured for indicating an orientation of the body. The imitation fishing reel is attached to the body and includes a lever and a force-adjusting device. The lever is rotatably connected to the force-adjusting device. The transceiver unit is electrically connected to the force-adjusting device and is configured for receiving control signals. The force-adjusting device is configured for adjusting a rotating resistance to the lever according to the control signals.

14 Claims, 7 Drawing Sheets

ANGLING JOYSTICK AND GAMING DEVICE HAVING SAME

BACKGROUND

1. Technical Field

The present disclosure relates to angling joysticks and gaming devices having the same.

2. Description of Related Art

One of the many different video games that have been developed recently is an angling game. A typical joystick does not meet the user requirements for this game or allow the user to properly control the fishing process. Pressing the buttons of a typical joystick does not allow the user to experience the act of fishing and it can be very boring for the user.

Therefore, an angling joystick and a gaming device which can reenact real life angling action, are needed.

DETAILED DESCRIPTION

Figure 1:
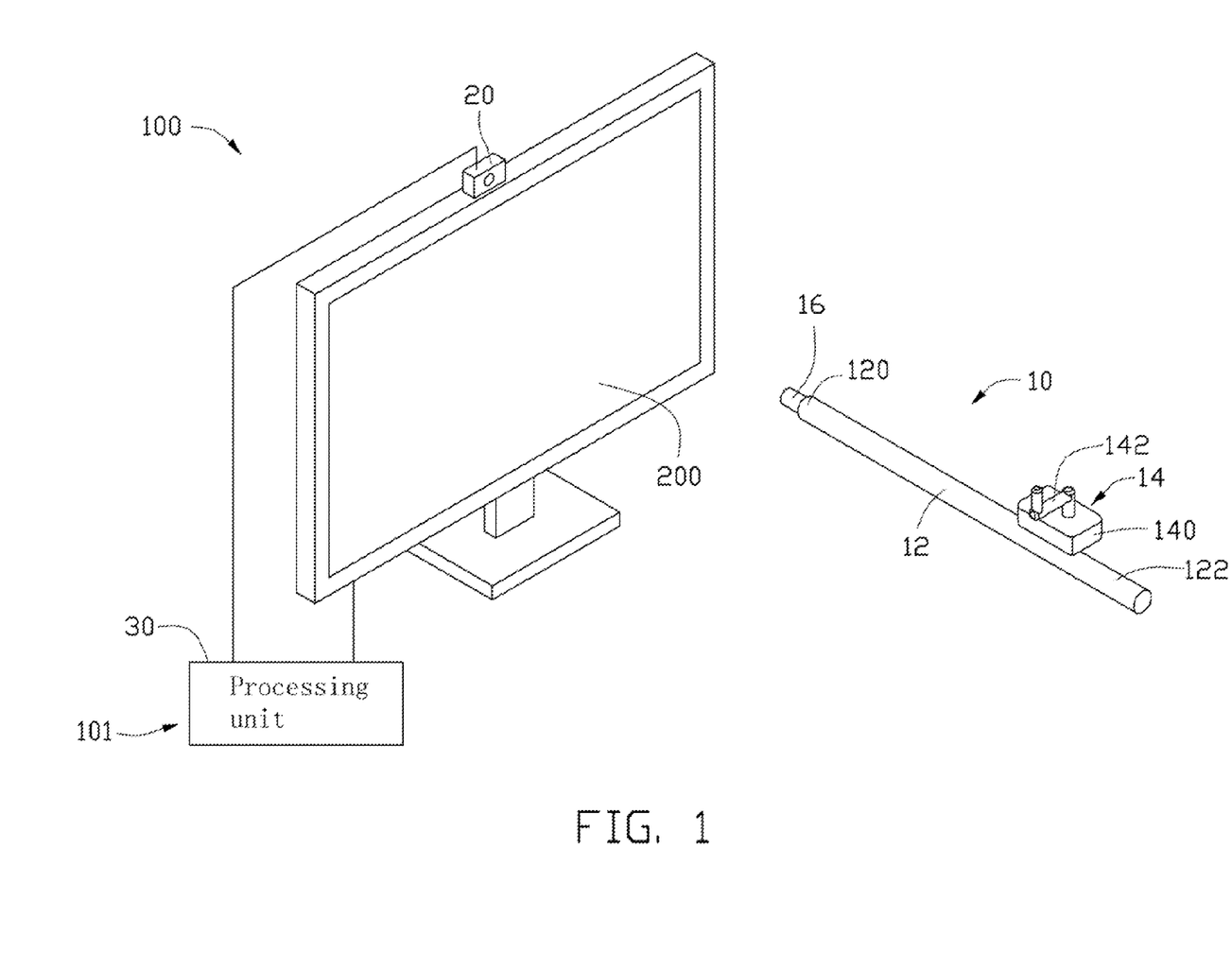
FIG. 1 is an isometric and schematic view of a gaming device including an imitation fishing reel, according to a first embodiment.
Figure 2:
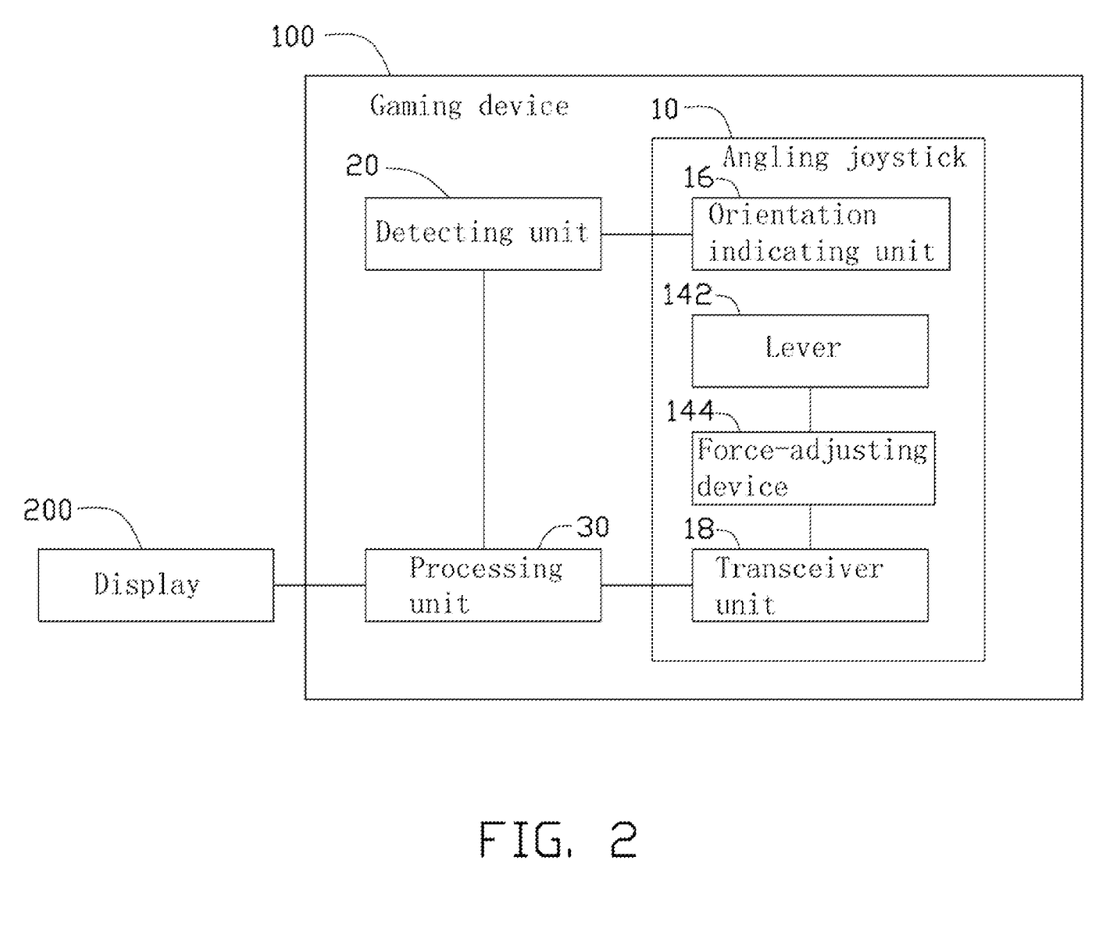
FIG. 2 is a functional block diagram of the gaming device of FIG. 1.

Referring to FIGS. 1-2, a gaming device 100, according to a first embodiment, includes an angling joystick 10, and a game console 101. The game console 101 includes a detecting unit 20 and a processing unit 30. Games launched by the gaming device 100 are displayed on a display 200.

The angling joystick 10 includes a rod-shaped body 12, an imitation fishing reel 14, an orientation indicating unit 16 and a transceiver unit 18.

The body 12 may be a hollow cylinder or a solid cylinder. The body 12 includes a first end 120 and a second end 122 opposite to the first end 120. The orientation indicating unit 16 is attached to the body 12 and is configured for indicating an orientation of the body 12. In this embodiment, the orientation indicating unit 16 is attached to an end surface of the first end 120. In this embodiment, the orientation indicating unit 16 is an infrared-light emitting unit.

The imitation fishing reel 14 is attached to the second end 122 and includes a housing 140, a lever 142 and a force-adjusting device 144.

The housing 140 is positioned at the second end 122 and receives the force-adjusting device 144. The lever 142 rotatably extends through the housing 140. In this embodiment, the lever 142 includes a grip 145 and a lever gear 146. The lever gear 146 is fixed to a distal end of the grip 145 in the housing 140.

Figure 3:
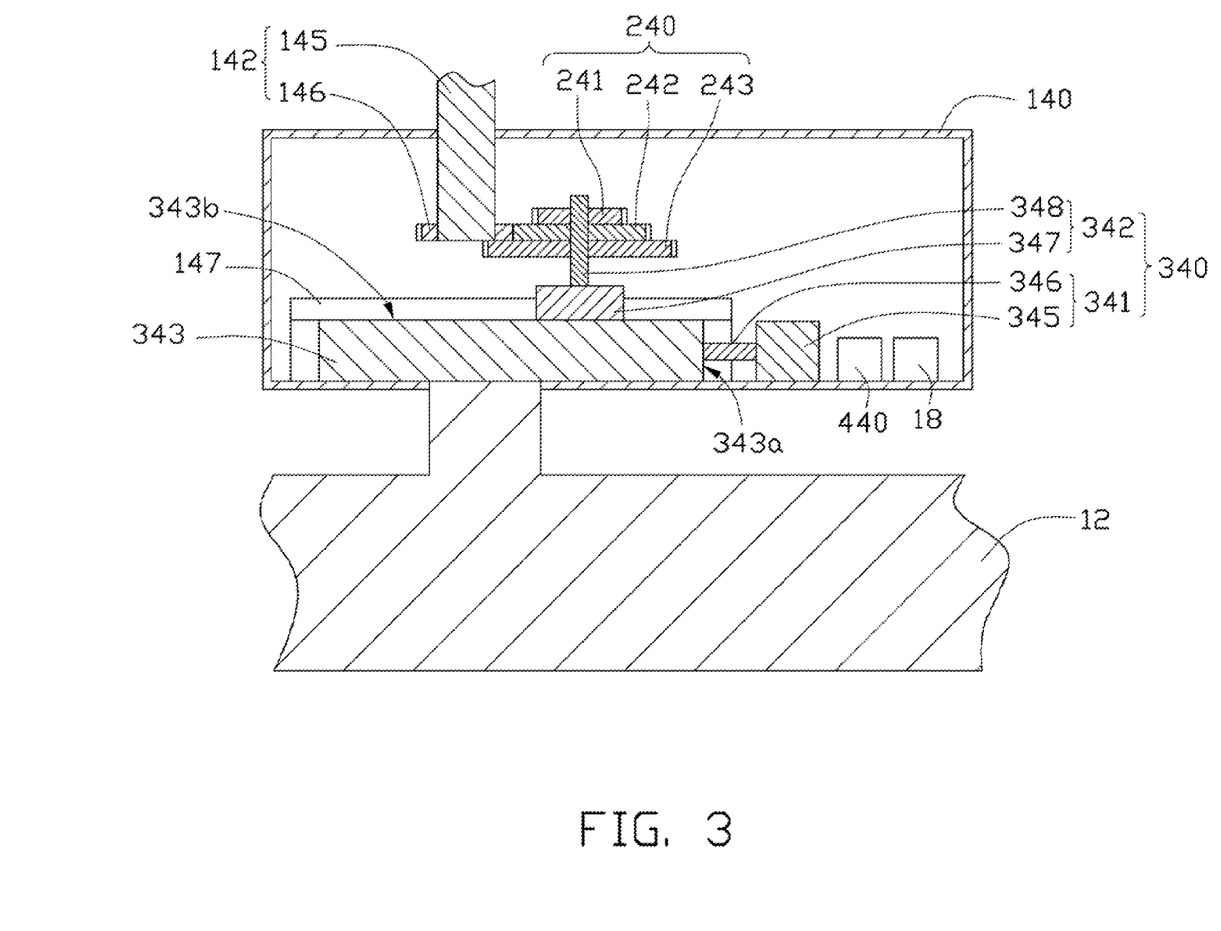
FIG. 3 is a sectional view of the imitation fishing reel of FIG. 1.

Referring to FIG. 3, the force-adjusting device 144 is configured for adjusting a rotating resistance to the lever 142. The force-adjusting device 144 includes a controller 440, a gear unit 240 and a driving unit 340. In this embodiment, the gear unit 240 includes three gears 241, 242 and 243 of different radiuses (hereinafter a first gear 241, a second gear 242 and a third gear 243). The radius of the first gear 241 is smaller than that of the second gear 242. The radius of the second gear 242 is smaller than that of the third gear 243.

The driving unit 340 includes a first actuator 341, a second actuator 342, and a moveable platform 343. The first actuator 341 and the second actuator 342 are linear actuators. The first actuator 341 includes a first body 345 and a first driving rod 346. The first body 345 is fixed to an inner wall of the housing 140. The first driving rod 346 is retractably connected to the first body 345. The distal end of the first driving rod 346 is fixedly attached to a side surface 343a of the movable platform 343.

The second actuator 342 includes a second body 347 and a second driving rod 348. The second body 347 is fixed on a top surface 343b of the moveable platform 343. The top surface 343b of the moveable platform 343 is substantially perpendicular to the side surface 343a of the moveable platform 343. The second driving rod 348 is retractably connected to the second body 347. The second driving rod 348 is substantially perpendicular to the first driving rod 346.

The third gear 243, the second gear 242 and the first gear 241 are rotatably sleeved on the second driving rod 348 in corresponding order away from the second body 347. The gears 241, 242 and 243 move together with the moveable platform 343. The controller 440 is configured for controlling the driving unit 340 to selectively engage the first gear 241, the second gear 242 or the third gear 243 with the lever gear 146 to adjust the rotating resistance to the lever 142. For example, initially, the second gear 242 is engaged with the lever gear 146. The controller 440 controls the driving unit 340 to shorten the first driving rod 346. The moveable platform 343 is drawn by the first driving rod 346 to move towards the first body 345. Therefore, the gear unit 240 on the second driving rod 348 moves away from the lever gear 146 and the second gear 242 parts from the lever gear 146. Then, the controller 440 controls the driving unit 340 to extend the second driving rod 348. The gear unit 240 moves away from the moveable platform 343 until the third gear 343 is engaged with the lever gear 146. Therefore, switch of the different gears engaging with the lever gear 146 is achieved. The angling joystick 10 further includes two L-shaped guiding arms 147 (only one guiding arm 147 is illustrated in FIG. 3). The two guiding arms 147 are spaced from each other. The guiding arm 147 extends along the first driving rod 346. The moveable platform 343 is slidably received between the two guiding arms 147. Therefore, the moveable platform 343 can be guided to move along the first driving rod 346.

The transceiver unit 18 is configured for receiving control signals from the control unit 30 and transmitting the control signals to the controller 440. In this embodiment, the transceiver unit 18, which is a Bluetooth™ transceiver unit, is received in the housing 140. The controller 440 controls the driving unit 340 to selectively engage the first gear 241, the second gear 242, or the third gear 243 with the lever gear 146 according to the control signals.

The detecting unit 20 is positioned on top of the display 200. The detecting unit 20 is an infrared-light detecting unit and includes a lens module and an infrared sensor. The detecting unit 20 communicates with the orientation indicating unit 16 to get the orientation of the body 12. The processing unit 30 may be a gaming host and communicates with the detecting unit 20 and the transceiver unit 18. The processing unit 30 has output/input interfaces to allow the processing unit 30 to communicate with peripherals, such as the detecting unit 20, the transceiver unit 18 and the display 200.

The operations of the gaming device 100 are described below.

Figure 4:
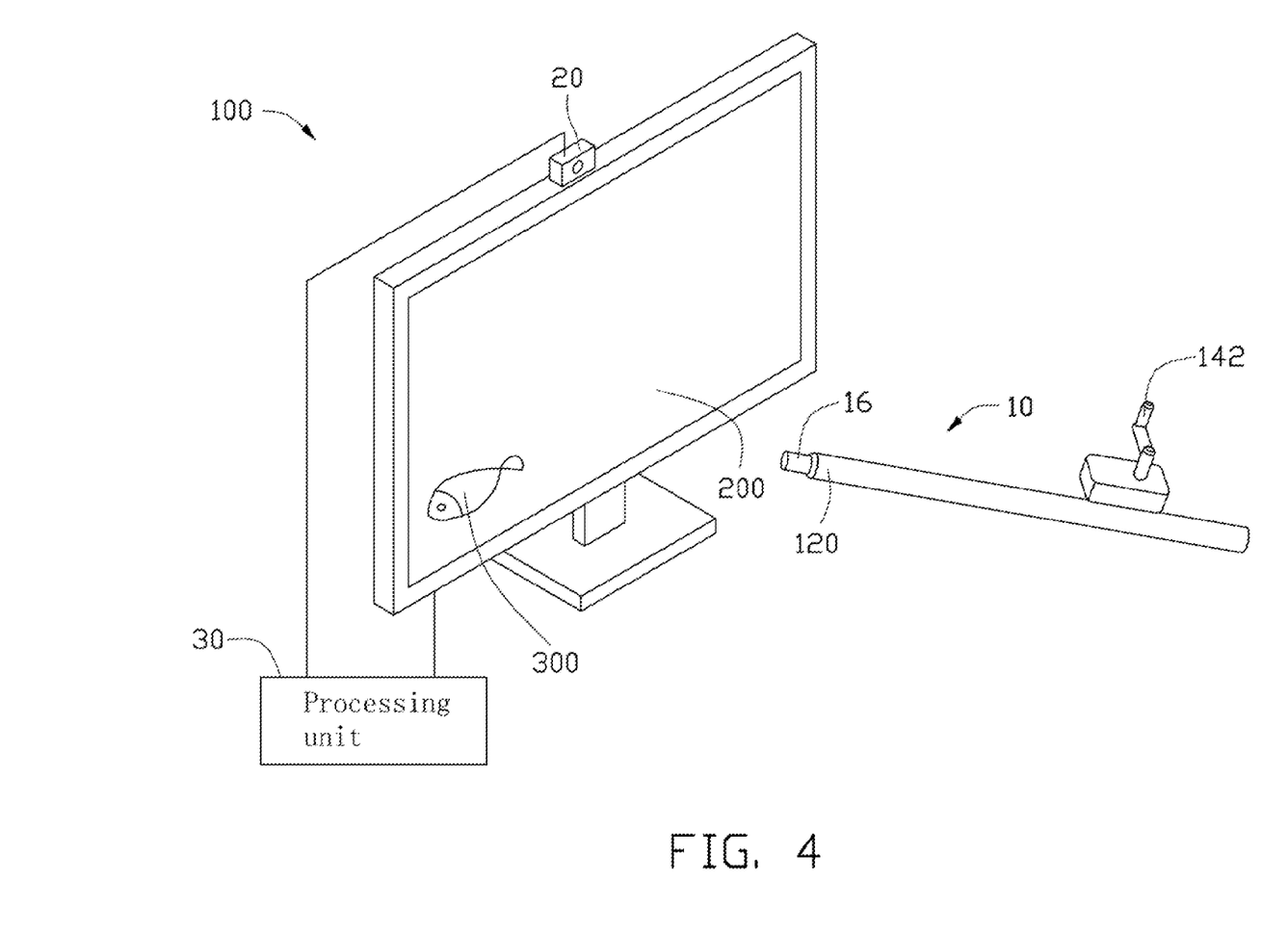
FIG. 4 shows a first operation state of the gaming device of FIG. 1.

Initially, the second gear 242 is engaged with the lever gear 146. Further referring to FIGS. 3-4, an angling game is launched by the gaming device 100 and is displayed on the display 200. The angling joystick 10 is held with one hand gripping the grip 145 of the lever 142. When the user gets a fish 300 in the game, the fish 300 is swimming towards a left side of the display 200 and the first end 120 of the angling joystick 10 points towards the left side of the display 200. Under this circumstance, the detecting unit 20 gets the orientation of the first end 120 of the angling joystick 10 through the orientation indicating unit 16 and transmits the orientation of the first end 120 of the angling joystick 10 to the processing unit 30. Then the processing unit 30 sends out a first control signal towards the transceiver unit 18 according to the orientation of the first end 120 of the angling joystick 10. The transceiver unit 18 receives and transmits the first control signal towards the controller 440. The controller 440 controls the driving unit 340 to make the second gear 242 separate from the lever gear 146 and engage the first gear 241 with the lever gear 146 (see above) to reduce the rotating resistance to the lever 142. Therefore, the user may feel that rotating the lever 142 is easier than before, and get a feeling of paying out a line in real angling.

Figure 5:
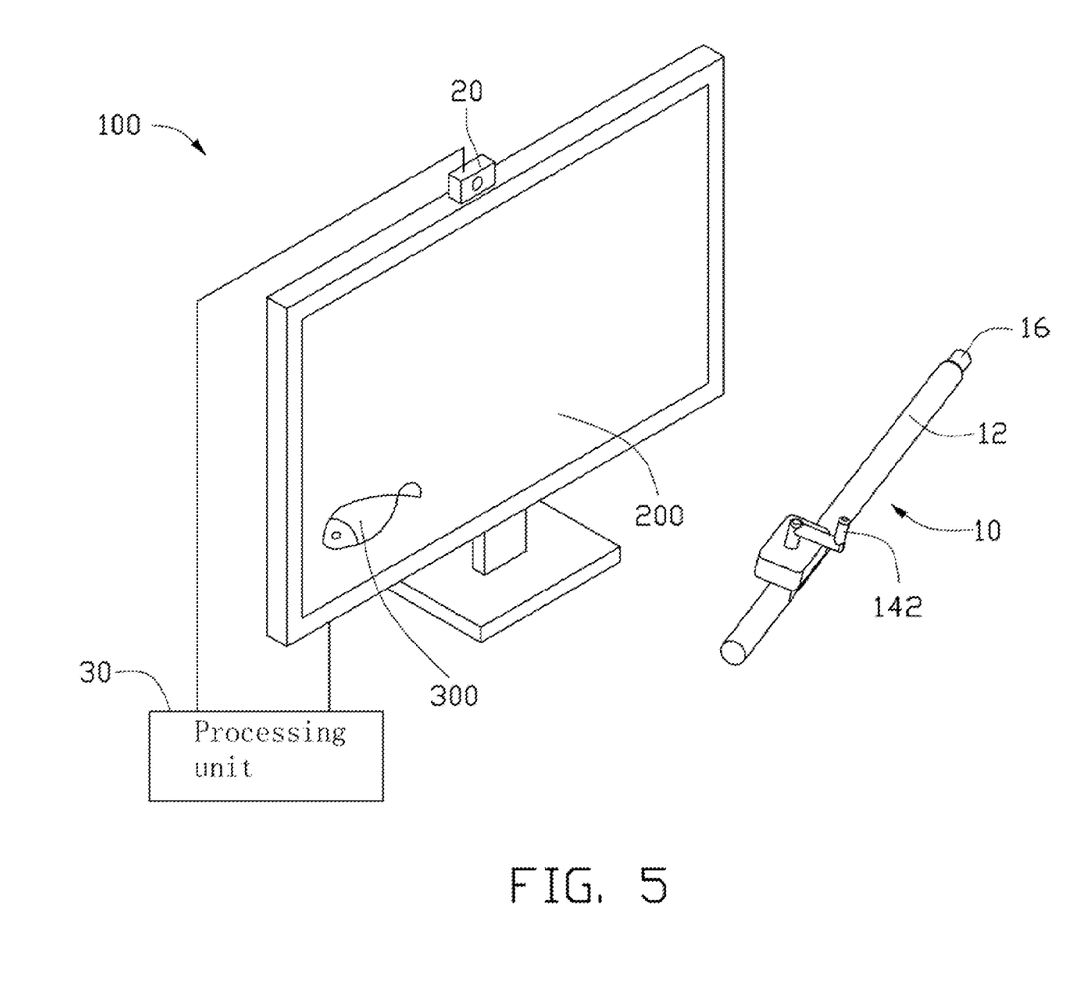
FIG. 5 shows a second operation state of the gaming device of FIG. 1.

Referring to FIG. 5, another circumstance is shown. The fish 300 is swimming towards a left side of the display 200 and the first end 120 of the angling joystick 10 points towards a right side of the display 200. Under this circumstance, the detecting unit 20 gets the orientation of the first end 120 of the angling joystick 10 through the orientation indicating unit 16 and transmits the orientation of the first end 120 of the angling joystick 10 to the processing unit 30. Then the processing unit 30 sends out a second control signal towards the transceiver unit 18 according to the orientation of the first end 120 of the angling joystick 10. The transceiver unit 18 receives and transmits the second control signal towards the controller 440. The controller 440 controls the driving unit 340 to make the second gear 242 separate from the lever gear 146 and engage the third gear 243 with the lever gear 146 to increase the rotating resistance to the lever 142. Therefore, the user may feel that rotating the lever 142 is harder than before, and get a feeling of retrieving the line in real angling.

Figure 6:
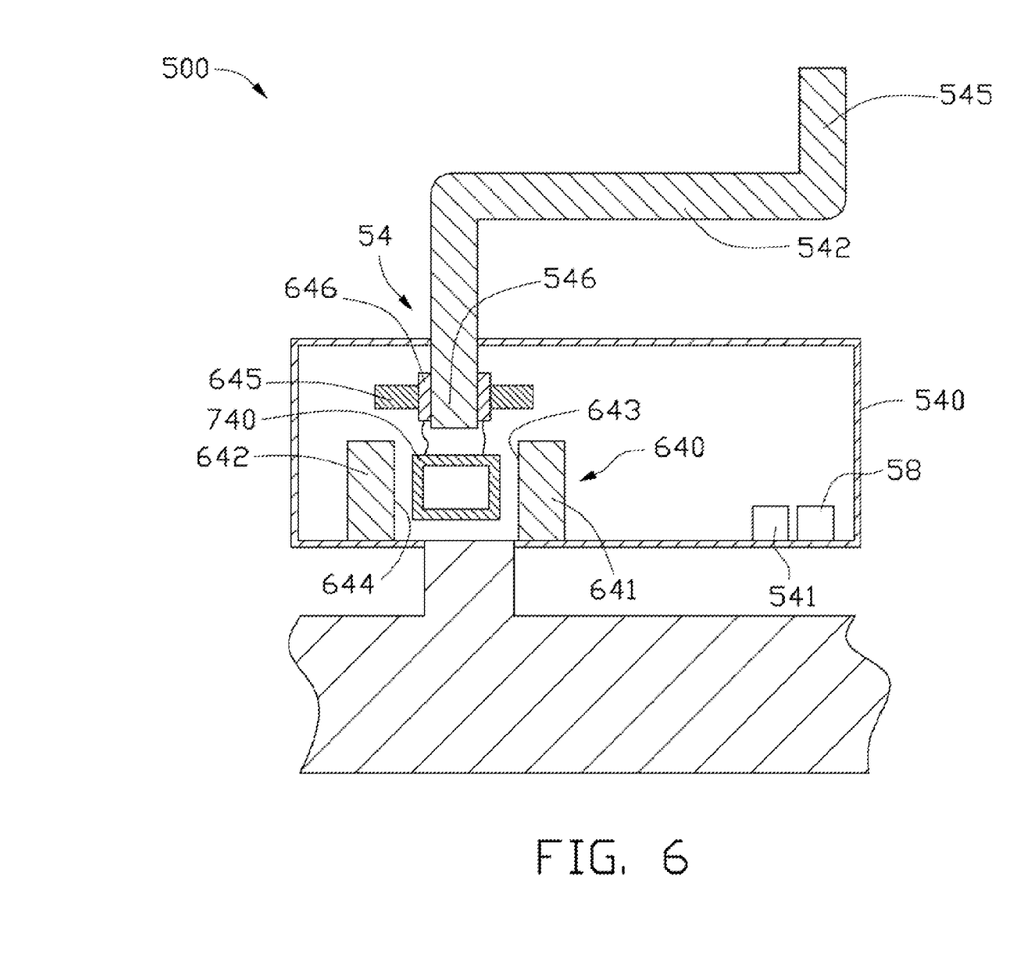
FIG. 6 is a sectional view of an imitation fishing reel of a gaming device, according to a second embodiment.

Referring to FIG. 6, a gaming device 500, according to a second embodiment, is shown. The difference between the gaming device 500 of this embodiment and the gaming device 100 of the first embodiment is that an imitation fishing reel 54 is different.

In this embodiment, the imitation fishing reel 54 includes a lever 542 and a force-adjusting device (not labeled). The lever 542 includes a griping end 545 and a coupling end 546. The griping end 545 is substantially parallel to the coupling end 546. The griping end 545 is outside a housing 540. The coupling end 546 is received in the housing 540. The lever 542 is made from an insulative material.

The force-adjusting device includes a controller 541, an electromagnetic unit 640, a coil 740, and an assistance circuit (not labeled).

The electromagnetic unit 640 includes a first electromagnet 641 and a second electromagnet 642. The first electromagnet 641 includes a first magnetic pole 643 opposite to the second electromagnet 642. The second electromagnet 642 includes a second magnetic pole 644 opposite to the first electromagnet 641. The first magnetic pole 643 is opposite to the second magnetic pole 644. The first electromagnet 641 and the second electromagnet 642 may be electrically connected to a primary power source (not shown). The primary power source may be a battery unit received in the angling joystick or an outer power source.

The assistance circuit includes a secondary power source (not shown, such as a battery or other built-in power sources), two carbon brushes 645 and two slip-rings 646. Two distal ends of the coil 740 are electrically connected to the respective slip-rings 646. The slip-rings 646 are substantially semi-circular and the two slip-rings 646 are spaced opposite to each other. The secondary power source, the carbon brushes 645, the slip-rings 646 and the coil 740 are connected in series to form a control circuit. The slip-rings 646 rotatably and electrically contact with the respective carbon brushes 645. The slip-rings 646 rotate with the rotation of the coil 740. The coupling end 546 fixedly extends through the slip-rings 646.

The controller 541 is electrically connected to the transceiver unit 58, the electromagnetic unit 640 and the secondary power source, and the primary power source. The controller 541 is configured for controlling the opening and closing of the control circuit, and controlling a current flowing through the electromagnetic unit 640 by the primary power source to adjust a rotation speed of the coil 740. That is, a magnetic field generated by the electromagnetic unit 640 changes according to change of the current flowing through the electromagnetic unit 640. When current is applied to the coil 740 by the secondary power source, the coil 740 together with the lever 542 rotate in the magnetic field generated by the electromagnetic unit 640. If the user rotates the lever 542 along the rotation of the lever 542, he will feel that rotating the lever 542 is easier. If the user rotates the lever 542 against the rotation of the lever 542, he will feel that rotating the lever 542 is harder. The rotation speed of the coil 740 changes accordingly, when the magnetic field generated by the electromagnetic unit 640 changes. Therefore, the rotating resistance to the lever 542 also changes. The feeling of paying out and retrieving the line in real angling can be achieved.

Figure 7:
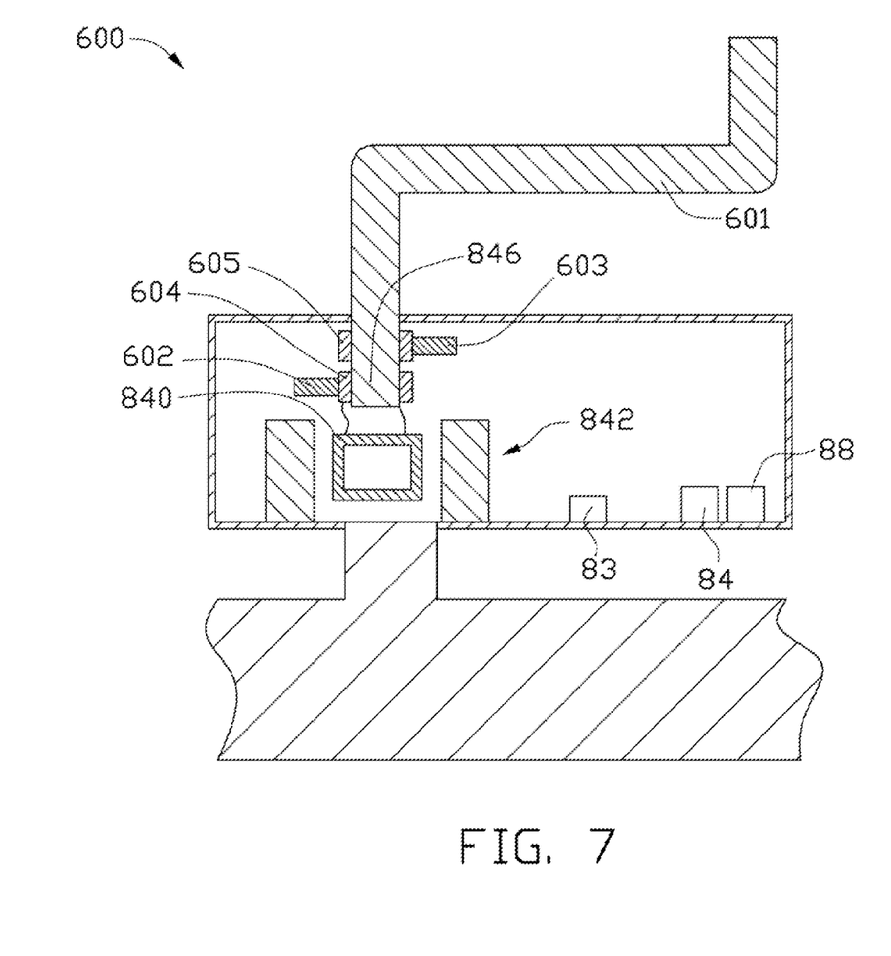
FIG. 7 is a sectional view of an imitation fishing reel of a gaming device, according to a third embodiment.

Referring to FIG. 7, a gaming device 600, according to a third embodiment, is shown. The difference between the gaming device 600 of this embodiment and the gaming device 500 of the second embodiment is that a force-adjusting device (not labeled) of the gaming device 600 is different.

In this embodiment, the force-adjusting device includes a controller 84 and an assistance circuit (not labeled).

The assistance circuit includes a load 83 (such as a resistor), a first carbon brush 602, a second carbon brush 603, a first slip-ring 604, and a second slip-ring 605. Two distal ends of a coil 840 are electrically connected respectively to the first slip-ring 604 and the second slip-ring 605. The first slip-ring 604 is spaced from the second slip-ring 605. The first slip-ring 604 and the second slip-ring 605 are circular. The load 83, the first carbon brushes 602, the first slip-ring 604, the coil 840, the second slip-ring 605 and the second carbon brush 603 are connected in series to form a control circuit. The first slip-ring 604 rotatably and electrically contacts with the first carbon brush 602. The second slip-ring 605 rotatably and electrically contacts with the second carbon brush 603. The coil 840 rotates with the rotation of the first slip-ring 604 and the second slip-ring 605. A coupling end 846 of a lever 601 fixedly extends through the first slip-ring 604 and the second slip-ring 605.

The controller 84 is electrically connected to a transceiver unit 88 and an electromagnetic unit 842. The controller 84 is configured for controlling a current flowing through the electromagnetic unit 842 to adjust the rotating resistance to the coil 840. That is, a magnetic field generated by the electromagnetic unit 842 changes according to change of the current flowing through the electromagnetic unit 842. Therefore, a torque applied to the coil 840 changes and the rotating resistance to the lever 601 changes. The feeling of paying out and retrieving the line in real angling can be achieved.

Since the angling joystick provides the feeling of real angling, people can better enjoy the angling game.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An angling joystick, comprising:
a body;
an orientation indicating unit attached to the body and configured for indicating an orientation of the body;
an imitation fishing reel attached to the body and comprising a force-adjusting device, and a lever rotatably coupled to the force-adjusting device, the force-adjusting device configured for adjusting a rotating resistance to the lever, the force-adjusting device comprising a controller, a driving unit and a gear unit, the gear unit comprising a first gear, a second gear and a third gear, the radius of the first gear being smaller than that of the second gear, the radius of the second gear being smaller than that of the third gear, the driving unit comprising a first actuator, a second actuator and a moveable platform, the first actuator comprising a retractable first driving rod, a distal end of the first driving rod being fixedly attached to a side surface of the movable platform, the second actuator positioned on the moveable platform and comprising a retractable second driving rod, the first gear, the second gear and the third gear rotatably sleeved on the second driving rod, the controller being configured for controlling the first actuator and the second actuator to selectively engage one of the first gear, the second gear or the third gear with the lever to adjust the rotating resistance to the lever; and
a transceiver unit electrically connected to the force-adjusting device and configured for receiving control signals generated according to the orientation of the body from a game console to control the controller of the force-adjusting device to adjust the rotating resistance to the lever according to the control signals.

2. The angling joystick of claim 1, wherein the body is rod-shaped and comprises a first end and a second end opposite to the first end, the orientation indicating unit being attached to the first end, the imitation fishing reel being attached to the second end.

3. The angling joystick of claim 1, wherein the imitation fishing reel further comprises a housing attached to the body, the force-adjusting device received in the housing and the lever rotatably extending through the housing.

4. The angling joystick of claim 1, wherein the orientation indicating unit is an infrared-light emitting unit and the transceiver unit is a Bluetooth™ transceiver unit.

5. The angling joystick of claim 1, wherein the force-adjusting device further comprises an electromagnetic unit and a coil arranged in a magnetic field of the electromagnetic unit, the controller being electrically connected to the transceiver unit and the electromagnetic unit, the coil being fixed to the lever, and the controller being configured for controlling a current flowing through the electromagnetic unit, thereby adjusting the rotating resistance to the lever according to the control signals.

6. A gaming device, comprising:
an angling joystick of claim 1;
a detecting unit configured for detecting an orientation of the body; and
a processing unit configured for generating the control signals according to the orientation of the body, and transmitting the control signals to the transceiver unit, the force-adjusting device configured for adjusting the rotating resistance to the lever according to the control signals.

7. The gaming device of claim 6, wherein the body is rod-shaped and comprises a first end and a second end opposite to the first end, the orientation indicating unit being attached to an end surface of the first end, the imitation fishing reel being attached to the second end.

8. The gaming device of claim 6, wherein the imitation fishing reel further comprises a housing attached to the body, the force-adjusting device received in the housing and the lever rotatably extending through the housing.

9. The gaming device of claim 6, wherein the orientation indicating unit is an infrared-light emitting unit and the transceiver unit is a Bluetooth™ transceiver unit.

10. The gaming device of claim 6, wherein the force-adjusting device further comprises an electromagnetic unit and a coil arranged adjacent to the electromagnetic unit, the controller being electrically connected to the transceiver unit and the electromagnetic unit, the coil being fixed to the lever, and the controller being configured for controlling a current flowing through the electromagnetic unit, thereby adjusting the rotating resistance to the lever according to the control signals.

11. A gaming device comprising:
an angling joystick comprising:
a rod-shaped body;
an orientation indicating unit attached to the body and configured for indicating an orientation of the body;
an imitation fishing reel attached to the body and comprising a force-adjusting device, and a lever rotatably coupled to the force-adjusting device, the force-adjusting device configured for applying an adjustable rotating resistance to the lever, the force-adjusting device comprising a controller, a driving unit and a gear unit, the gear unit comprising a first gear, a second gear and a third gear, the radius of the first gear being smaller than that of the second gear, the radius of the second gear being smaller than that of the third gear, the driving unit comprising a first actuator, a second actuator and a moveable platform, the first actuator comprising a retractable first driving rod, a distal end of the first driving rod being fixedly attached to a side surface of the movable platform, the second actuator positioned on the moveable platform and comprising a retractable second driving rod, the first gear, the second gear and the third gear rotatably sleeved on the second driving rod, the controller being configured for controlling the first actuator and the second actuator to selectively engage one of the first gear, the second gear or the third gear with the lever to adjust the rotating resistance to the lever; and
a transceiver unit electrically connected to the force-adjusting device; and
a game console comprising:
a detecting unit configured for monitoring the orientation indicating unit and determining the orientation of the body; and
a processing unit configured for generating control signals according to the orientation of the body, and transmitting the control signals to the transceiver unit to control the controller of the force-adjusting device to adjust the rotating resistance to the lever according to the control signals.

12. The gaming device of claim 11, wherein the body comprises a first end and a second end opposite to the first end, the orientation indicating unit being attached to an end surface of the first end, the imitation fishing reel being attached to the second end.

13. The gaming device of claim 11, wherein the imitation fishing reel further comprises a housing attached to the body, the force-adjusting device received in the housing and the lever rotatably extending through the housing.

14. The gaming device of claim 11, wherein the orientation indicating unit is an infrared-light emitting unit and the transceiver unit is a Bluetooth™ transceiver unit.

* * * * *